(12) United States Patent
Himmelmann (10) Patent No.: US 9,926,886 B2
(45) Date of Patent: Mar. 27, 2018

(54) MAGNETO-RHEOLOGIC DAMPER FOR ELECTROMECHANICAL ACTUATOR

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 262 days.

(21) Appl. No.: 14/997,949

(22) Filed: Jan. 18, 2016

(65) Prior Publication Data

US 2017/0204934 A1    Jul. 20, 2017

(51) Int. Cl.
  *F02K 9/80* (2006.01)
  *F16F 9/53* (2006.01)
  *F16F 15/00* (2006.01)

(52) U.S. Cl.
  CPC ........... *F02K 9/805* (2013.01); *F02K 9/80* (2013.01); *F16F 9/535* (2013.01); *F16F 15/005* (2013.01); *F16F 2226/04* (2013.01)

(58) Field of Classification Search
  CPC .. F02K 9/80; F02K 9/805; F16F 9/535; F15B 21/065
  See application file for complete search history.

(56) References Cited

U.S. PATENT DOCUMENTS

| | | | | |
|---|---|---|---|---|
| H001292 | H * | 3/1994 | Marsh | 60/326 |
| 5,607,123 | A * | 3/1997 | Larsen | F02K 9/805 244/171.2 |
| 5,967,273 | A * | 10/1999 | Hampton | F16D 37/008 192/21.5 |
| 6,402,091 | B1 * | 6/2002 | Hansen | B64G 1/401 239/265.35 |
| 7,412,930 | B2 * | 8/2008 | Smith | F42B 10/54 102/473 |
| 2011/0148052 | A1 * | 6/2011 | Quemere | B60G 17/005 280/6.15 |
| 2015/0068190 | A1 * | 3/2015 | Roger | F01D 17/141 60/226.2 |

* cited by examiner

*Primary Examiner* — Thomas E Lazo
(74) *Attorney, Agent, or Firm* — Cantor Colburn LLP (57) ABSTRACT

A thrust vector control actuator is provided including a ram first portion, a ram second portion, the ram second portion housed within the ram first portion and defining a damper cavity between the ram first portion and the ram second portion and the ram second portion configured to operably connect to an output link, and a magneto-rheologic fluid located within the damper cavity, the magneto-rheologic fluid configured to rigidly connect the ram first portion and the ram second portion in a first state, the magneto-rheologic fluid being solid in the first state, and a second state wherein the ram second portion is moveable relative to the ram first portion and the magneto-rheologic fluid is at least partially liquefied.

17 Claims, 6 Drawing Sheets

MAGNETO-RHEOLOGIC DAMPER FOR ELECTROMECHANICAL ACTUATOR

BACKGROUND

The subject matter disclosed herein generally relates to electromechanical thrust vector control actuators and, more particularly, to magneto-rheologic dampers for electromechanical thrust vector control actuators.

Rockets may be used to launch payloads into space, including inserting payloads into various orbits around the earth or other celestial bodies and/or directing payloads through space. Rockets are maneuvered by vectoring a rocket engine thrust direction. In some configurations, a thrust vector control system may be configured to use hydraulic rams to displace an engine nozzle angle relative to a rocket core axis to control a thrust vector to ensure proper propulsion of a rocket. Hydraulic rams require high pressure hydraulic fluid pumping systems capable of providing, for example, up to 4000 psia at flow rates of 40-100 gallons per minute or greater.

During a start cycle of a rocket engine, a large transient force can be applied to the thrust vector control actuators. This transient force can be several times larger than the normal maximum force applied to the thrust vector control actuator during normal operation. With this type of loading, hydraulic actuators are well suited, as they incorporate hydraulic high pressure relief valves which allow the actuator to momentarily drift, relieving the load, during the high load, short duration transient events. This type of response is acceptable during engine start, because the rocket has not left the launch pad yet and there is time to reposition the engine after the transient event has passed and the loads have returned to normal.

Electromechanical actuation systems may provide increased efficiency as compared to hydraulic actuators and provide additional safety benefits. However, small, high power density, electromechanical actuators may not be able to relieve high transient loads because of the rotational inertia associated with associated high speed electric motors. Accordingly, electromechanical actuators must be designed to mechanically support the high transient loads without experiencing damage. Accordingly, an electromechanical actuator capable of relieving short transient forces may provide benefits to rocket engines.

SUMMARY

According to one embodiment, a thrust vector control actuator is provided. The actuator includes a ram first portion, a ram second portion, the ram second portion housed within the ram first portion and defining a damper cavity between the ram first portion and the ram second portion and the ram second portion configured to operably connect to an output link, and a magneto-rheologic fluid located within the damper cavity, the magneto-rheologic fluid configured to rigidly connect the ram first portion and the ram second portion in a first state, the magneto-rheologic fluid being solid in the first state, and a second state wherein the ram second portion is moveable relative to the ram first portion and the magneto-rheologic fluid is at least partially liquefied.

In addition to one or more of the features described above, or as an alternative, further embodiments of the thrust vector control actuator may include a housing configured to house the ram first portion and the ram second portion.

In addition to one or more of the features described above, or as an alternative, further embodiments of the thrust vector control actuator may include a magnetic field generator controllable to apply a magnetic field to the magneto-rheologic fluid.

In addition to one or more of the features described above, or as an alternative, further embodiments of the thrust vector control actuator may include an output link operably connected to the ram second portion and a load sensor operably connected to the output link, the load sensor configured to detect a transient force event.

In addition to one or more of the features described above, or as an alternative, further embodiments of the thrust vector control actuator may include a damper plate located within the damper cavity, the damper plate having at least one aperture configured to permit the magneto-rheologic fluid to flow through the at least one aperture, when in the second state.

In addition to one or more of the features described above, or as an alternative, further embodiments of the thrust vector control actuator may include that the damper plate is rigidly connected to the second ram portion.

In addition to one or more of the features described above, or as an alternative, further embodiments of the thrust vector control actuator may include a drive motor assembly operably connected to the first ram portion.

According to one embodiment, a method of manufacturing a thrust vector control actuator is provided. The method includes installing a ram first portion into a housing, installing a ram second portion into the housing, the ram second portion housed within the ram first portion and defining a damper cavity between the ram first portion and the ram second portion, filling the damper cavity with a magneto-rheologic fluid, the magneto-rheologic fluid configured to rigidly connect the ram first portion and the ram second portion in a first state, the magneto-rheologic fluid being solid in the first state, and a second state wherein the ram second portion is moveable relative to the ram first portion and the magneto-rheologic fluid is at least partially liquefied, and operably connecting the ram second portion to an output link.

In addition to one or more of the features described above, or as an alternative, further embodiments of the method may include installing a magnetic field generator into the housing, the magnetic field generator controllable to apply a magnetic field to the magneto-rheologic fluid.

In addition to one or more of the features described above, or as an alternative, further embodiments of the method may include operably connecting a load sensor to the output link, the load sensor configured to detect a transient force event.

In addition to one or more of the features described above, or as an alternative, further embodiments of the method may include installing a damper plate within the damper cavity, the damper plate having at least one aperture configured to permit the magneto-rheologic fluid to flow through the at least one aperture when in a liquid state.

In addition to one or more of the features described above, or as an alternative, further embodiments of the method may include that the damper plate is rigidly connected to the second ram portion.

In addition to one or more of the features described above, or as an alternative, further embodiments of the method may include operably connecting a drive motor assembly operably to the first ram portion.

According to another embodiment, a method of operating a thrust vector control actuator is provided. The method includes detecting a transient force event, controlling a magnetic field to liquefy a magneto-rheologic fluid located within a damper cavity, wherein a ram second portion is movable relative to a ram first portion, detecting the transient force event has ended, and controlling the magnetic field to solidify the magneto-rheologic fluid within the damper cavity to rigidly connect the ram second portion to the ram first portion.

In addition to one or more of the features described above, or as an alternative, further embodiments of the method may include that the magnetic field is controlled by an application of a current.

In addition to one or more of the features described above, or as an alternative, further embodiments of the method may include that the transient force event is detected by a load sensor.

In addition to one or more of the features described above, or as an alternative, further embodiments of the method may include driving the ram first portion with a drive motor assembly.

Technical effects of embodiments of the present disclosure include an electromechanical thrust vector control actuator having a dampening mechanism to withstand short, transient forces while minimizing the size and/or weight of the electromechanical thrust vector control actuator. Further technical effects include incorporating a magneto-rheologic damper in an electromechanical thrust vector control actuator.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 1A:
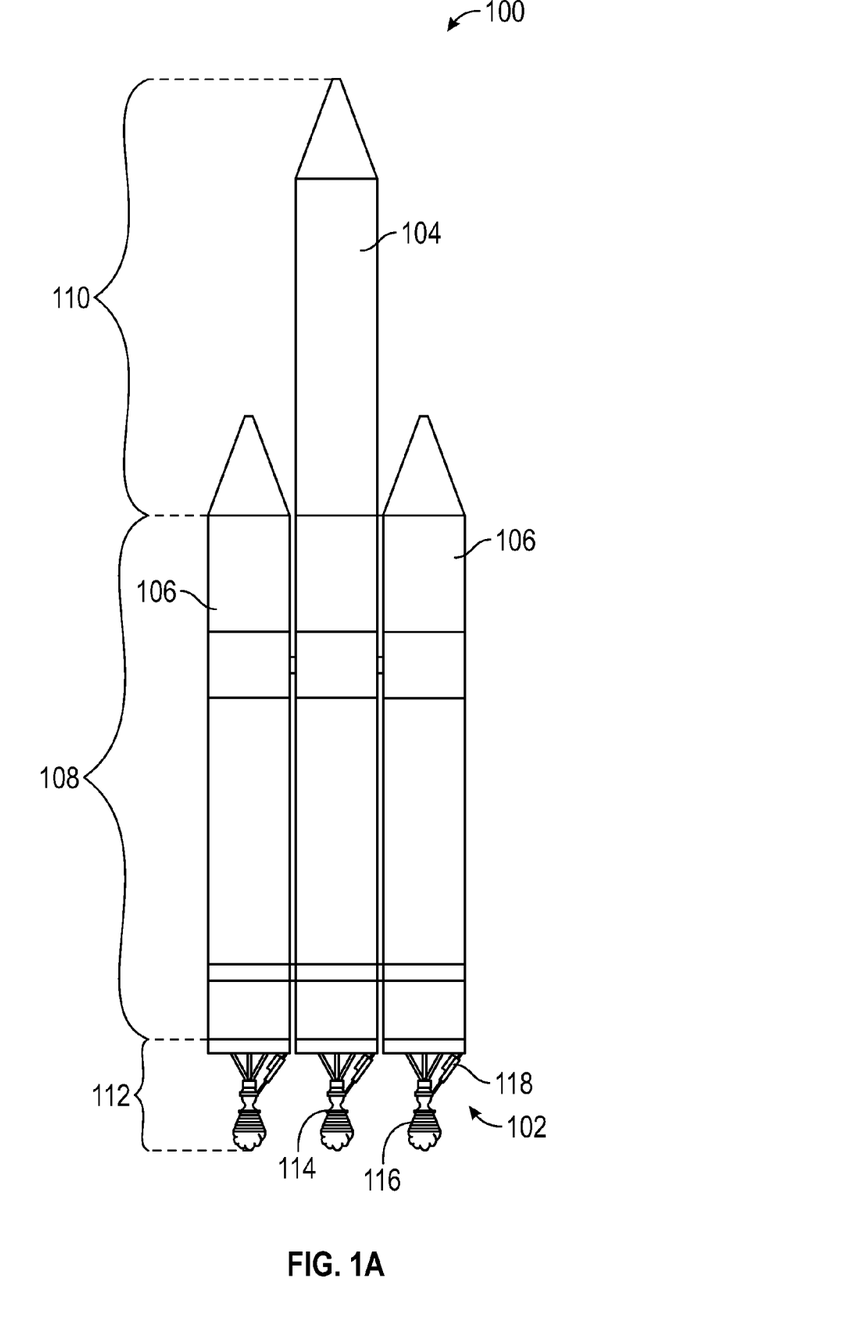
FIG. 1A is a schematic illustration of a craft that may incorporate embodiments of the present disclosure.
Figure 1B:
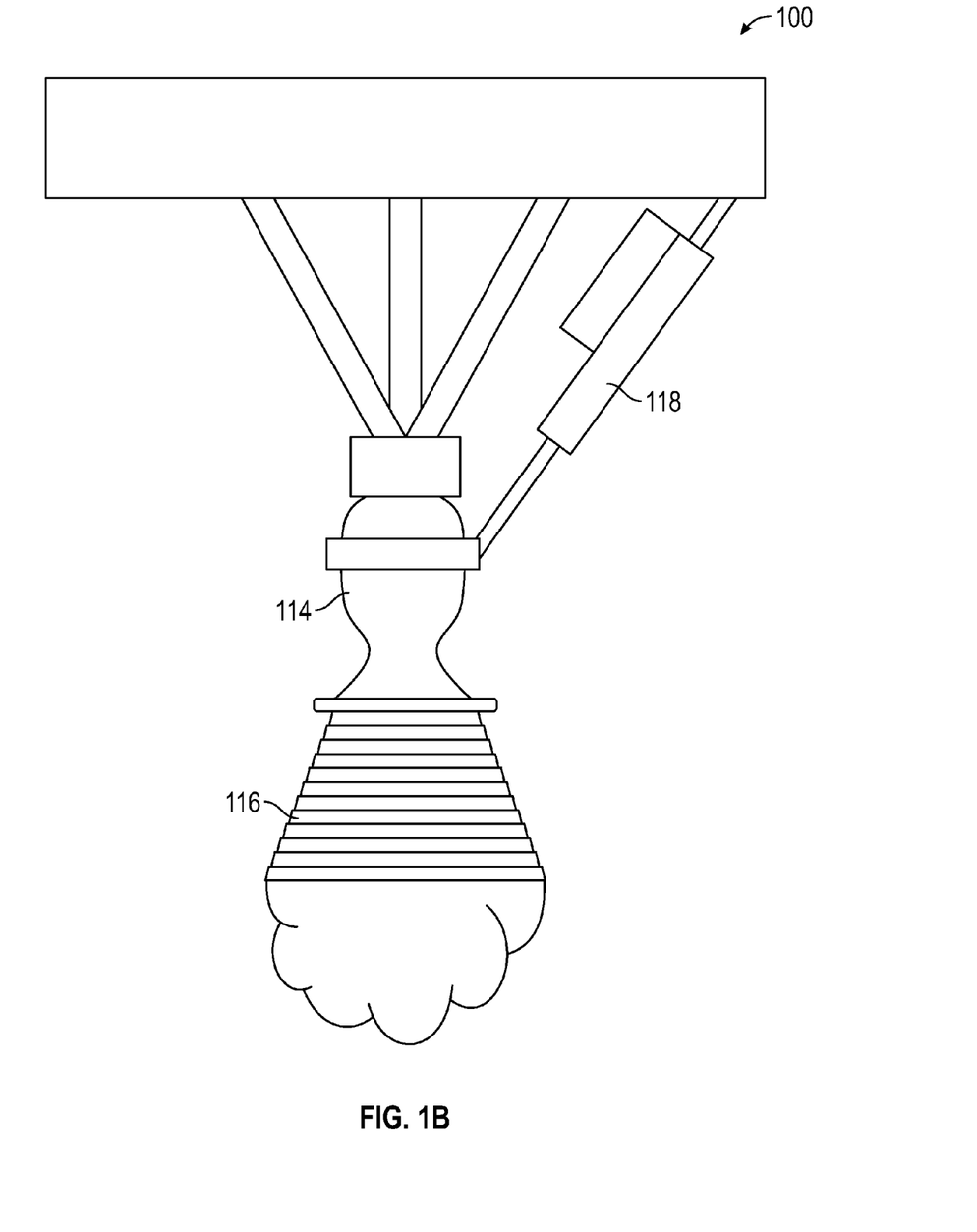
FIG. 1B is an enlarged schematic illustration of a portion of the craft of FIG. 1A.

FIGS. 1A and 1B show schematic illustrations of a craft 100 that may be configured to employ embodiments provided herein. FIG. 1A shows a schematic illustration of the craft 100, which may be a rocket or other space craft. FIG. 1B shows an enlarged schematic illustration of the propulsion system 102 of the craft 100.

The craft 100 may include a core booster 104 and may also have additional boosters 106. Each booster 104, 106 includes a body portion 108 extending from a nose portion 110 to a tail portion 112. The tail portion includes the propulsion system 102. The propulsion system 102 includes an engine 114 of the booster. The body portions 108 may contain a liquid or solid propellant to fuel the engine 114 of the respective booster 104, 106. The body portion 108 may also be segmented into multiple booster stages, wherein each stage may contain its own engine. The nose portion 110 may contain, but is not limited to, avionics, payload, and crew compartment, etc. depending on the mission and/or configuration of the craft 100.

As shown, the craft 100 may have a propulsion system 102 that may be configured as one or more rocket engines 114. Each engine 114 may be configured with a nozzle 116 that is configured to direct an output of the respective engine 114. The nozzle 116 thus enables directional control of the thrust of the engine 114 and thus the craft 100. That is, depending on the angle of tilt of the nozzle 116, the craft 100 may be propelled in a specific direction. As such, control of the engine 114 and/or nozzle 116 may be paramount to directional control and safety.

Referring now to FIG. 1B, an enlarged schematic illustration of the propulsion system 102 of the craft 100 according to an embodiment of the present disclosure. The engine 114 may include a combustion chamber and a throat with the nozzle 116 configured thereon to direct exhaust from the throat. Fuel from a respective booster (e.g., boosters 104, 106) is fed into the combustion chamber and ignited. As will be appreciated by those of skill in the art, the combustion chamber may be larger or smaller depending on numerous variables, such as, for example fuel type. For instance, for a solid fuel rocket booster a portion of the booster body or the entire booster body may serve as the combustion chamber. The controlled explosion accelerates as it passes through the throat and out the nozzle 116. This controlled explosion creates the thrust required to propel the craft 100. In order to maneuver the craft 100, the thrust may be directed by a thrust vector control actuator 118, which physically moves, tilts, translates, rotates, directs and/or adjusts the direction or angle of the engine 114 and/or the nozzle 116 to direct the thrust and thus the direction of movement of the craft 100. As will be appreciated by those of skill in the art, there may be two or more thrust vector control actuators 118 included on the craft 100, with multiple thrust vector control actuators 118 configured for each engine and/or nozzle. For example, in some embodiments, two thrust vector control actuators may be positioned about ninety degrees apart to provide pitch and yaw capability to the craft 100. Accordingly, the thrust vector control actuators 118 may be provided in operational connection with the engine 114 and/or the nozzle 116. In some configurations, the thrust vector control actuators may incorporate hydraulic actuators and in other configurations the thrust vector control actuators may incorporate electromechanical actuators.

As provided herein, in accordance with some embodiments of the present disclosure, electromechanical actuators for thrust vector control actuators are disclosed. In some embodiments, a magneto-rheologic fluid damper is incorporated on an output ram of the thrust vector control actuator.

Figure 2A:
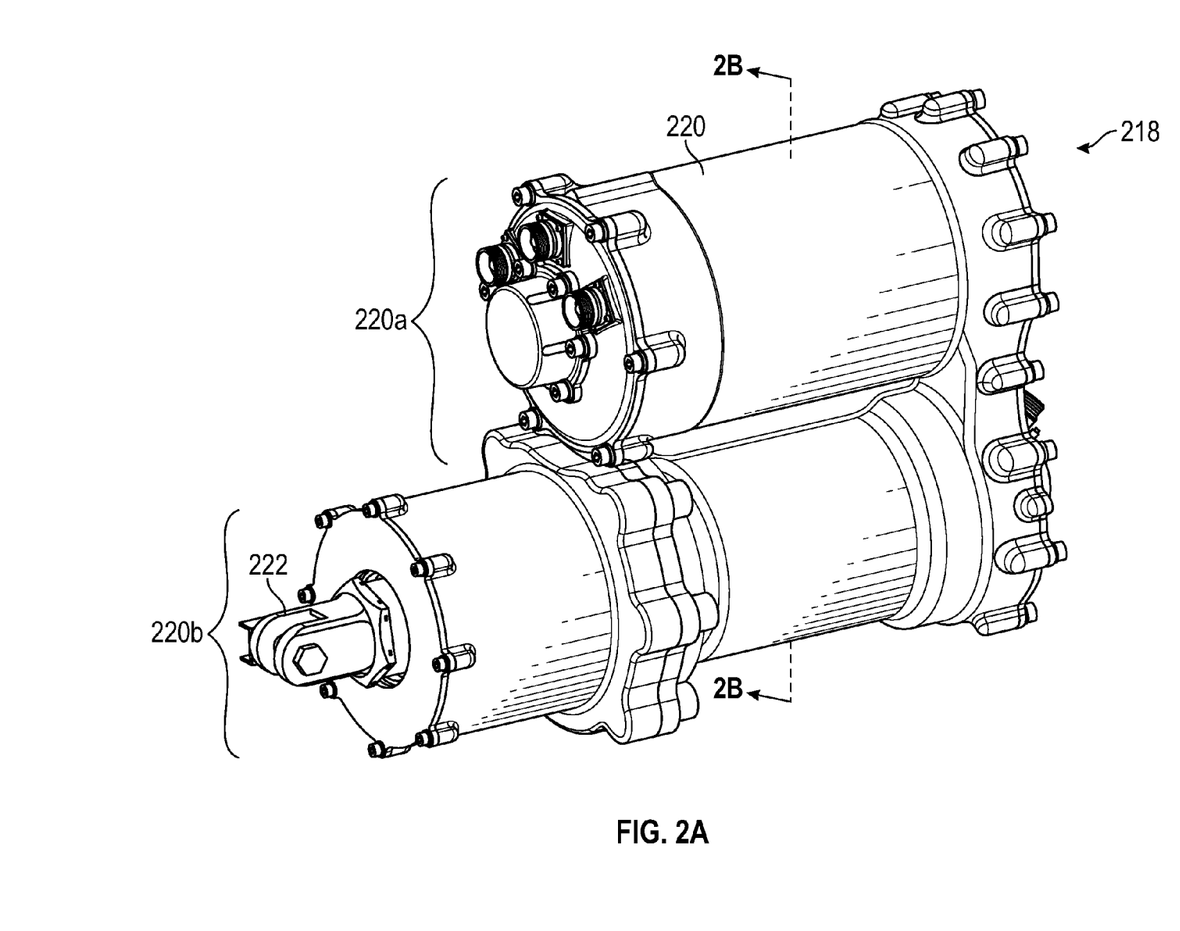
FIG. 2A is schematic illustration of a thrust vector control actuator in accordance with an embodiment of the present disclosure.
Figure 2B:
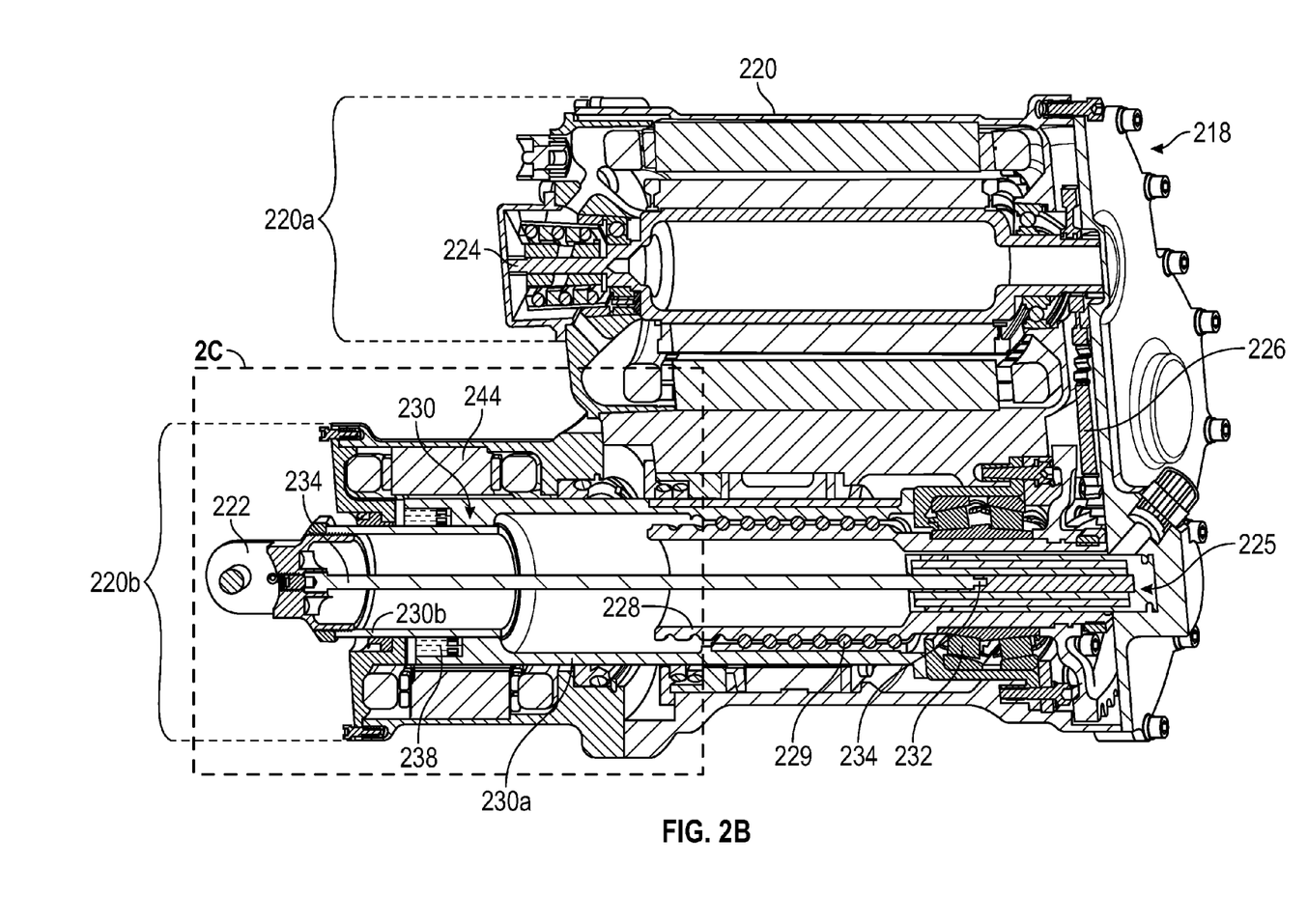
FIG. 2B is a schematic cross-sectional illustration of the thrust vector control actuator of FIG. 2A.
Figure 2C:
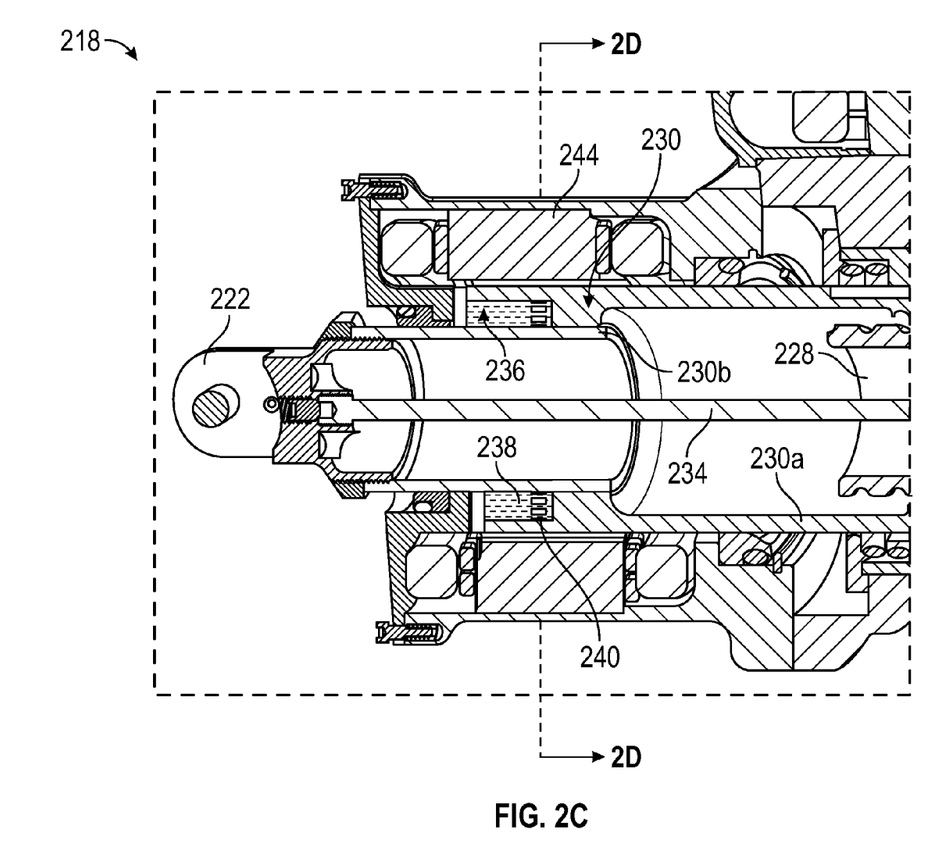
FIG. 2C is an enlarged, cross-sectional schematic illustration of a portion of the thrust vector control actuator of FIG. 2A, as indicated in FIG. 2B.
Figure 2D:
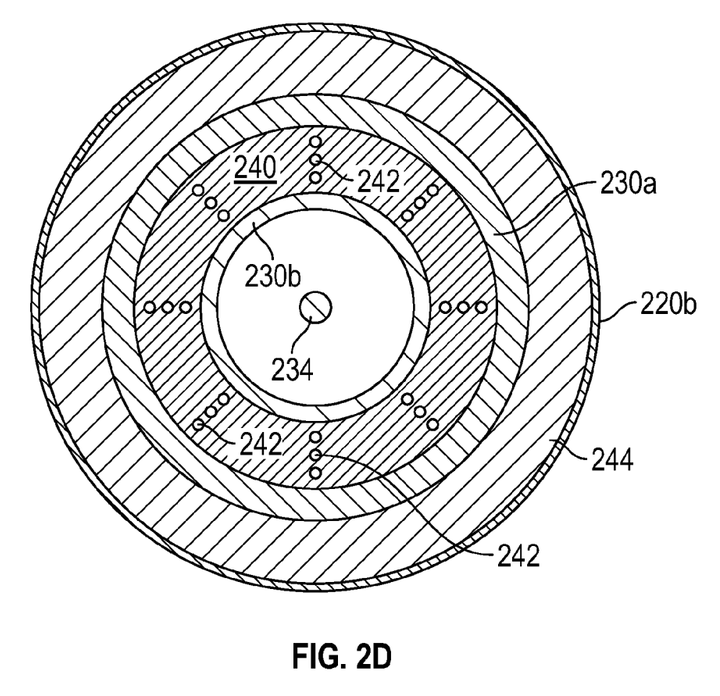
FIG. 2D is a cross-sectional schematic illustration of the thrust vector control actuator of FIG. 2A, as indicated in FIG. 2C.

For example, with reference to FIGS. 2A-2D, various schematic illustrations of a thrust vector control actuator 218 in accordance with a non-limiting embodiment of the present disclosure are shown. FIG. 2A shows an isometric illustration of the thrust vector control actuator 218 that may be configured to control a thrust vector of an engine or nozzle of a rocket propulsion system (e.g., as shown and described with respect to FIGS. 1A and 1B). FIG. 2B is a cross-sectional schematic illustration illustrating the components of the thrust vector control actuator 218. FIG. 2C is an enlarged schematic illustration of a portion of the cross-sectional schematic illustration shown in FIG. 2B. FIG. 2D is an end-on schematic illustration of a portion of an actuator section of the thrust vector control actuator 218.

The thrust vector control actuator 218 includes a housing 220 configured to house a drive motor assembly 224 and an actuator 225. As such, the housing 220 may include or define a housing first section 220a configured to house the drive motor assembly and a housing second section 220b configured to house the actuator 225 and an associated output link 222. The output link 222 may be operably connected to an engine and/or nozzle of a propulsion system (e.g., propulsion system 102 shown in FIGS. 1A and 1B).

Turning to FIG. 2B, a cross-sectional schematic illustration of the thrust vector control actuator 218 is shown as viewed along the line 2B-2B of FIG. 2A. As shown, the housing first section 220a of the housing 220 encloses a drive motor assembly 224. The drive motor assembly 224 may be configured in various manners including, but not limited to, direct drive motors, servomotors, electromagnetic motors, transverse flux motors, electric motors, parallel flux motors, brushed permanent magnet motor, brushless permanent magnet motor, wound field motor, induction motor, switched reluctance motor, etc.

The drive motor assembly 224 may be operably connected to the actuator 225 that may support movement of the output link 222 by a gear reduction system 226. The gear reduction system 226 may drive or rotate a ball screw assembly 228. The ball screw assembly 228 may be driven or rotated by rotation of the gear reduction system 226 which is driven by the drive motor assembly 224. As the ball screw assembly 228 rotates, an output ram 230 may be moved or driven within the housing 220. The ball screw assembly 228 may drive the output ram 230 through a threaded connection wherein bearings 229 are located within threads of both the ball screw assembly 228 and threads of a portion of the output ram 230. A thrust bearing 232 may be positioned about a portion of the ball screw assembly 228.

The ball screw assembly 228 may move within the housing second section 220b of the housing 220 to drive the output ram 230. The output ram 230 may include a ram first portion 230a (e.g., a ball screw ram) and a ram second portion 230b (e.g., an actuator output ram). The ram first portion 230a may be operably connected to the ball screw assembly 228 such that rotation of the ball screw assembly 228 may translate the ram first portion 230a relative to the housing 220. The ram second portion 230b may in contact with and movable relative to and/or with the ram first portion 220a, depending on a state as described below. The output link 222 may be rigidly connected or attached to the ram second portion 230b. Thus, operation of the drive motor assembly 224 may enable control and movement of the output link 222 through the actuator 225. As shown, the thrust vector control actuator 218 may have a position sensor 234 extending from the output link 222 through the ball screw assembly 228 and mount to a portion of the housing 220. In some non-limiting embodiments, the position sensor 234 may be a linear variable differential transformer. The position sensor 234 may be configured to ensure proper positioning of the engine, nozzle, etc. Further, in some embodiments, a load sensor (not shown) may be configured to determine that a force being generated by the engine nozzle is lower than a pre-determined maximum force capability of the actuator structure. If a force is detected that is above the pre-determined maximum force capability, the actuator may be configured to react and account for the increased, transient force.

Turning to FIG. 2C, an enlarged schematic illustration of the output ram 230 is shown. As shown, a damper cavity 236 may be formed between the ram first portion 230a and the ram second portion 230b. The damper cavity 236 may be filled with a magneto-rheologic fluid 238. A magneto-rheologic fluid is a substance that acts like a low viscosity fluid under certain conditions. However, when subjected to a magnetic field, the viscosity of the magneto-rheologic fluid increases. Further, if the magnetic field is strong enough, the magneto-rheologic fluid may act like a solid.

Also located within the damper cavity 236 is a damper plate 240. The damper plate 240 may be connected to or part of the ram second portion 230b, as shown. However, in other embodiments, the damper plate 240 may be connected to or part of the ram first portion 230a. In the configuration shown in FIGS. 2A-2D, when the ram second portion 230b moves relative to the ram first portion 230a, the damper plate 240 may move within the damper cavity 236. The damper plate 240 may include a plurality of apertures 242 (see FIG. 2D) that enable the damper plate 240 to move within the damper cavity 236 when the magneto-rheologic fluid 238 is in a liquid state. Thus, when the magneto-rheologic fluid 238 is in a liquid state, the ram second portion 230b may move relative to the ram first portion 230a, with the liquid flowing through the apertures 242. When the magneto-rheologic fluid 238 is in a solid state, the damper plate 240 may be fixed in position within the damper cavity 236. The damper cavity 236, the magneto-rheologic fluid 238, and the damper plate 240 form a magneto-rheologic fluid damper for the thrust vector control actuator 218.

That is, when the magneto-rheologic fluid 238 is in a first or solid state, the ram second portion 230b may be rigidly fixed to the ram first portion 230a, such that the output ram 230 is a solid component (i.e., the parts of the output ram 230 move as a single component or device). When the magneto-rheologic fluid 238 is in a second or liquid state, the ram second portion 230b may be movable relative to the ram first portion 230a. Control of the state of the magneto-rheologic fluid 238 may be provided by a magnetic field generator 244. In accordance with a non-limiting embodiment of the present disclosure, the magnetic field generator 244 may be configured as an induction coil that receives an electric current to induce a desired magnetic field.

The magneto-rheologic fluid damper is designed to function as a solid link (e.g., first state) during normal loading condition and during transient overload conditions the magneto-rheologic fluid 238 is configured to at least partially liquefy. A transient overload condition may be detected by one or more load sensors configured on or in the thrust vector control actuator 218 and/or on or in a component to which the thrust vector control actuator 218 is attached and/or connected. The one or more load sensors may be in operable communication with a controller that is configured to control the magnetic field of the magnetic field generator 244.

Liquefaction is achieved by reducing a strength of the magnetic field acting on the magneto-rheologic fluid 238 as generated by the magnetic field generator 244. Such a phase transition of the magneto-rheologic fluid 238 enables the output link 222 to deflect relative to the housing 220, thereby relieving the transient load. After the transient load has passed, the magneto-rheologic fluid 238 is configured to re-solidify by controlling the magnetic field with the magnetic field generator 244 (e.g., generating the magnetic field or increasing the magnetic field), thus re-establishing a solid link between the ram first portion 230a and the ram second portion 230b, and therefore establishing a solid link between the thrust vector control actuator 218 and an engine or nozzle of a craft. The position sensor 234 may be used to ensure that the engine and/or nozzle of the engine is in a proper or desired position, after a transient load has passed. If the position sensor 234 is not in a proper or desired position, a controller may drive the drive motor assembly 224 to move the engine or nozzle to a proper or desired position.

Advantageously, thrust vector control actuator 218, and thrust vector control actuators as provided herein, may be configured to withstand short transient force spikes that may be many times higher than the normal operating loads of the thrust vector control actuator. During these transient force spikes, the thrust vector control actuator (or a portion thereof) may be allowed to drift or move such that the transient force spike may be accounted for and absorbed without damage to the thrust vector control actuator.

Figure 3:
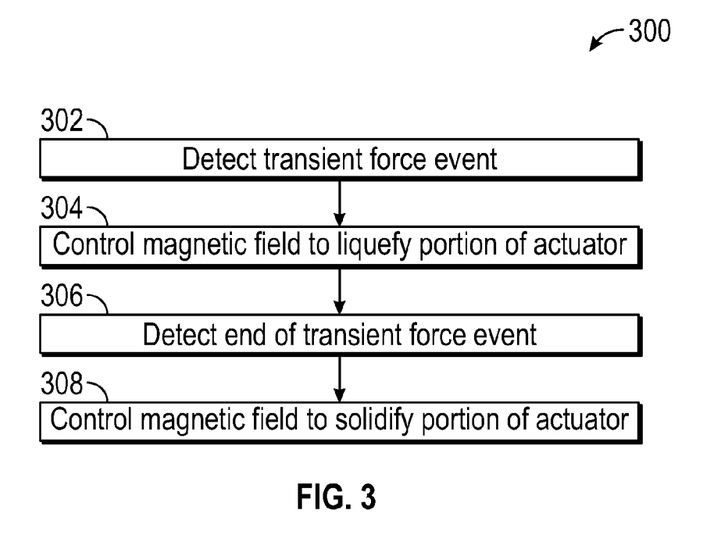
FIG. 3 is a flow process for operating a thrust vector control actuator in accordance with an embodiment of the present disclosure.

Turning now to FIG. 3, a flow process 300 for operating a thrust vector control actuator in accordance with a non-limiting embodiment of the present disclosure is shown. The flow process 300 may be performed by and with a thrust vector control actuator as shown and described above, including a magneto-rheologic fluid in a portion of the thrust vector control actuator.

As shown at block 302, a transient force event may be detected. The detection may be made by a load sensor or other sensor (e.g., a force sensor, load cell, strain gauge, etc.) or detector that is configured in operable communication with a portion of a thrust vector control actuator. In some embodiments, the detection may be made by a sensor located within the thrust vector control actuator, such as a position sensor connected to an output link that connects to an engine, nozzle, etc. In some embodiments, a load sensor may be located on a surface of the housing of the actuator.

In response to the detection of a transient force event, a magnetic field is controlled, as shown at block 304. The control of the magnetic field may be through application and/or control of an electric current through a coil or other structure, such that a variable and/or controllable magnetic field may be generated. As shown at block 304, the magnetic field may be controlled such that a magneto-rheologic fluid within the thrust vector actuator may be liquefied. For example, the magneto-rheologic fluid may be partially liquefied to a specific controlled viscosity, allowing for a highly damped motion of the rocket engine nozzle, relative to the actuator and rocket frame. The liquefaction of the magneto-rheologic fluid may enable the thrust vector actuator to receive and absorb the transient force or a portion thereof.

When the magneto-rheologic fluid is liquefied, one portion of the thrust vector actuator may be moveable relative to another portion of the thrust vector actuator. For example, a ram first portion and a ram second portion may be movable relative to each other, or one relative to the other, when the magneto-rheologic fluid is liquefied.

At block 306, it may be detected that the transient force event has ended. In some embodiments, the detection may be based on the movement of the load sensor and/or a force sensor. For example, a force sensor (e.g., a load cell) may be configured to determine that a force being generated by the engine nozzle is lower than a pre-determined maximum force capability of the actuator structure. In other embodiments, the detection of the end of a transient force event may be based on a timer that is predefined to account for a transient event and further maintain a proper connection with an engine, nozzle, etc.

When it is detected that the transient force event has ended (block 306), the magnetic field is controlled to solidify the magneto-rheologic fluid. The solidification of the magneto-rheologic fluid enables a rigid connection between portions of the thrust vector actuator. For example, when the magneto-rheologic fluid is solidified a ram first portion and a ram second portion may be fixed to each other to form a solid ram of the thrust vector actuator.

Advantageously, embodiments described herein provide an electromechanical actuator to be used as a part of a thrust vector actuator. For example, the thrust vector actuator may be configured to only support normal operating forces (which may be, for example, ten times lower than the transient force), while allowing for compensation and/or relief of the transient forces. Accordingly, this may allow the actuator to be, for example, up to ten times smaller (or more) and ten times lighter (or more) than an equivalent actuator that may be configured to support the full transient load.

Further, advantageously, as provided herein, a relatively small, relatively light weight electromechanical actuator may be used in a rocket or craft thrust vector control system. In some embodiments, advantageously, thrust vector actuators as provided herein may be configured for maximum operating force to thus provide efficient force absorption.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, although described herein with a particular configuration for a magneto-rheologic fluid to be incorporated into a thrust vector actuator, those of skill in the art will appreciate that other configurations may be used without departing from the scope of the present disclosure. For example, the apertures within the damper plate may be configured for optimal movement in a transient force event while also providing sufficient surface contact between the solidified magneto-rheologic fluid and the damper plate such that a solid connection and thus unified ram may be formed.

Further, the damper plate could be of a stacked washer-type (e.g., as used in conventional fluid dampers), or any other type of damper plate configuration.

Accordingly, the present disclosure is not to be seen as limited by the foregoing description, but is only limited by the scope of the appended claims.

What is claimed is:

1. A thrust vector control actuator comprising:
    a ram first portion;
    a ram second portion, the ram second portion housed within the ram first portion and defining a damper cavity between the ram first portion and the ram second portion and the ram second portion configured to operably connect to an output link; and
    a magneto-rheologic fluid located within the damper cavity, the magneto-rheologic fluid configured to rigidly connect the ram first portion and the ram second portion in a first state, the magneto-rheologic fluid being solid in the first state, and a second state wherein the ram second portion is moveable relative to the ram first portion and the magneto-rheologic fluid is at least partially liquefied.

2. The thrust vector control actuator of claim 1, further comprising a housing configured to house the ram first portion and the ram second portion.

3. The thrust vector control actuator of claim 1, further comprising a magnetic field generator controllable to apply a magnetic field to the magneto-rheologic fluid.

4. The thrust vector control actuator of claim 1, further comprising:
    an output link operably connected to the ram second portion; and
    a load sensor operably connected to the output link, the load sensor configured to detect a transient force event.

5. The thrust vector control actuator of claim 1, further comprising a damper plate located within the damper cavity, the damper plate having at least one aperture configured to permit the magneto-rheologic fluid to flow through the at least one aperture, when in the second state.

6. The thrust vector control actuator of claim 5, wherein the damper plate is rigidly connected to the second ram portion.

7. The thrust vector control actuator of claim 1, further comprising a drive motor assembly operably connected to the first ram portion.

8. A method of manufacturing a thrust vector control actuator comprising:
    installing a ram first portion into a housing;
    installing a ram second portion into the housing, the ram second portion housed within the ram first portion and defining a damper cavity between the ram first portion and the ram second portion;
    filling the damper cavity with a magneto-rheologic fluid, the magneto-rheologic fluid configured to rigidly connect the ram first portion and the ram second portion in a first state, the magneto-rheologic fluid being solid in the first state, and a second state wherein the ram second portion is moveable relative to the ram first portion and the magneto-rheologic fluid is at least partially liquefied; and
    operably connecting the ram second portion to an output link.

9. The method of claim 8, further comprising installing a magnetic field generator into the housing, the magnetic field generator controllable to apply a magnetic field to the magneto-rheologic fluid.

10. The method of claim 8, further comprising operably connecting a load sensor to the output link, the load sensor configured to detect a transient force event.

11. The method of claim 8, further comprising installing a damper plate within the damper cavity, the damper plate having at least one aperture configured to permit the magneto-rheologic fluid to flow through the at least one aperture when in a liquid state.

12. The method of claim 11, wherein the damper plate is rigidly connected to the second ram portion.

13. The method of claim 8, further comprising operably connecting a drive motor assembly operably to the first ram portion.

14. A method of operating a thrust vector control actuator comprising:
    detecting a transient force event;
    controlling a magnetic field to liquefy a magneto-rheologic fluid located within a damper cavity, wherein a ram second portion is movable relative to a ram first portion;
    detecting the transient force event has ended; and
    controlling the magnetic field to solidify the magneto-rheologic fluid within the damper cavity to rigidly connect the ram second portion to the ram first portion.

15. The method of claim 14, wherein the magnetic field is controlled by an application of a current.

16. The method of claim 14, wherein the transient force event is detected by a load sensor.

17. The method of claim 14, further comprising driving the ram first portion with a drive motor assembly.

* * * * *